United States Patent

[11] 3,562,561

[72] Inventor Carsten H. Klosterman
Winfield, Ill.
[21] Appl. No. 809,093
[22] Filed Mar. 21, 1969
[45] Patented Feb. 9, 1971
[73] Assignee Bell Telephone Laboratories, Incorporated
Murray Hill, Berkeley Heights, N.J.
a corporation of New York

[54] SHUNT TYPE NEGATIVE IMPEDANCE CONVERTER WITH BOTH SHORT AND OPEN CIRCUIT STABILITY
3 Claims, 2 Drawing Figs.

[52] U.S. Cl. .......... 307/313, 330/61; 333/80
[51] Int. Cl. .......... H03k 3/26, H03f 15/00; H03j 3/20
[50] Field of Search .......... 307/313; 330/61; 333/80, 80T; 179/170

[56] References Cited
UNITED STATES PATENTS

| | | | |
|---|---|---|---|
| 2,726,370 | 12/1955 | Linvill et al | 333/80 |
| 3,041,557 | 6/1962 | Sandberg | 333/80 |
| 3,384,844 | 5/1968 | Meacham | 307/313X |
| 3,439,120 | 4/1969 | Levine | 333/80UX |

*Primary Examiner*—Stanley D. Miller, Jr.
*Attorneys*—R. J. Guenther and R. B. Ardis

ABSTRACT: A shunt type negative impedance converter (NIC) which is normally only short circuit stable is also made open circuit stable by internal circuit action so that it can be used in shunt across telephone trunk circuits to cancel the resistance of central office battery feed resistors. It includes two transistors of opposite conductivity type with a resistive voltage divider and a zener diode controlling the base biasing voltage of the PNP transistor. Whenever a telephone subscriber goes on-hook, presenting a substantially open circuit to the converter, the action of the voltage divider and the zener diode causes both transistors to switch to their nonconducting states.

PATENTED FEB 9 1971 3,562,561

INVENTOR
C. H. KLOSTERMAN
BY R. B. Andis
ATTORNEY

SHUNT TYPE NEGATIVE IMPEDANCE CONVERTER WITH BOTH SHORT AND OPEN CIRCUIT STABILITY

BACKGROUND OF THE INVENTION

This invention relates generally to negative impedances and, more particularly, to converters for producing negative impedances of the shunt or reversed current type.

As outlined by George Crisson in his article "Negative Impedances and the Twin 21-Type Repeater," which appeared at page 485 of the Jul. 1931 issue of The Bell System Technical Journal, negative impedances fall into one or the other of two categories. The first of these includes negative impedances of the series or reversed voltage type. Such negative impedances are open circuit stable and can be connected in series with a transmission line to cancel the effect of positive series impedance. The other category includes negative impedances of the shunt or reversed current type. Such impedances are short circuit stable and can be connected in shunt across a transmission line to cancel the effect of positive shunt impedance. A negative impedance converter (NIC) produces a two-terminal impedance which is negatively related to a specific passive two-terminal terminating impedance and is open circuit stable or short circuit stable depending upon the classification of the negative impedance produced. Illustrative of successful negative impedance converters of both types is U.S. Pat. No 3,042,759, which issued Jun. 3, 1962, to A. L. Bonner.

Within a telephone central office, a trunk circuit is used to connect a subscriber line to another subscriber line or to an outgoing or incoming trunk. In such a connection, the trunk circuit must allow not only two-way voice frequency transmission with minimum signal attenuation but must also pass central office battery current to operate locally connected subscriber telephone sets and supervise both directions of transmission. In the past, the office battery has normally been connected in series with a pair of inductors in a shunt path across the trunk circuit to supply the required office battery current and, at the same time, provide both a low impedance for direct supervisory currents and a high AC shunt impedance. In order to reduce the physical size of trunk circuits, the inductors could be replaced by resistors if it were possible to connect a shunt type negative resistance across the line in parallel with the path including the office battery and the resistors. Because shunt type negative impedance converters are characteristically only short circuit stable, however, converters found in the prior art cannot be used in such an application without risking circuit instability (oscillatory action) whenever the subscriber telephone set is returned to its on-hook state. Although the trunk circuit is terminated in a relatively low impedance when the subscriber telephone set is off-hook, it is open-circuited when the subscriber telephone set is on-hook and the shunt type negative impedance converters found in the prior art are not open circuit stable.

A principal object of the present invention is to provide a negative impedance converter of the shunt type which is not only short circuit stable but effectively open circuit stable as well.

Another and more particular object is to provide such a converter in as simple and economical a manner as possible.

SUMMARY OF THE INVENTION

In accordance with the present invention, a two-terminal shunt type negative impedance converter is made up of a pair of transistors of opposite conductivity type having their collector electrodes connected to respective external terminals, the terminating impedance is connected between the transistor emitter electrodes, and separate voltage dividers are connected between the external terminals and supply respective transistor base electrodes with operating base biases, at least one of the voltage dividers including a voltage limiter between the base electrode of its transistor and the collector electrode of the other transistor to switch both transistors to their nonconducting states in response to an open circuit between the external terminals. When used to provide a negative resistance in parallel with a resistive battery feed in a central office telephone trunk circuit, such a converter is inherently stable when the subscriber telephone set is off-hook and, because both transistors are switched off, remains effectively stable when the subscriber telephone set is on-hook. At the same time, it needs no internal biasing voltage source and is operated entirely from the voltage drop across the battery feed resistors through which central office battery current flows to operate and supervise the subscriber telephone set.

In at least one important embodiment of the invention, the transistors are of the NPN and PNP types, respectively, and the voltage limiter is a zener diode connected between the base electrode of the PNP transistor and the collector electrode of the NPN transistor and poled for reverse current flow in the direction from the collector electrode of the NPN transistor toward the base electrode of the PNP transistor. With an open circuit across the external terminals of the converter, the office battery voltage divides between the resistors in series with the battery and the converter voltage dividers, causing the voltage across the latter to rise. As a result of the voltage limiting action of the zener diode, the voltage at the base electrode of the PNP transistor rises more rapidly than that at its emitter electrode, causing the emitter-base bias on the PNP transistor to reverse and both transistors to switch to their nonconducting states.

THE DRAWING

DETAILED DESCRIPTION

Figure 1:
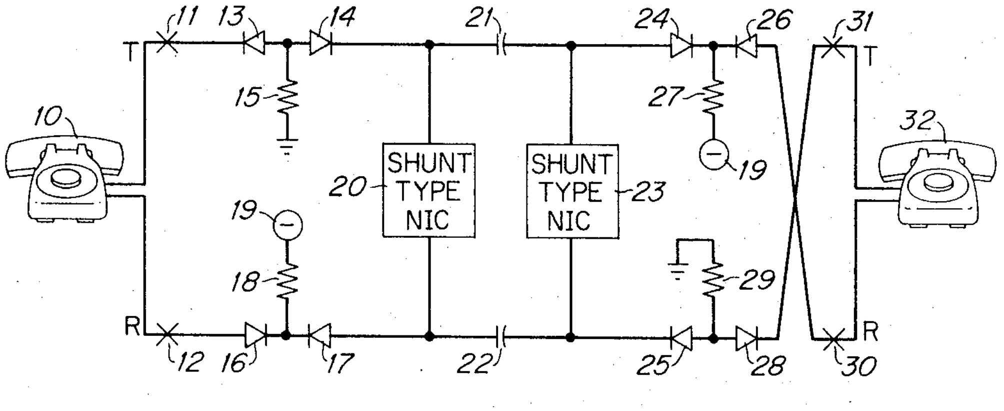
FIG. 1 illustrates a portion of a telephone trunk circuit embodying the invention interconnecting a pair of lines leading to subscriber telephone sets.

As shown in FIG. 1 of the drawing, a subscriber telephone set 10 having a pair of switchhook contacts 11 and 12 is connected to one end of the central office trunk circuit. The tip side of the line (marked T) contains switchhook contact 11 and is connected to the cathode of a first protective diode 13. The anode of diode 13 is connected to the anode of the second protective diode 14 and through a current limiting resistor 15 to ground. The ring side of the line (marked R) contains switchhook contact 12 and is connected to the anode of a third protective diode 16. The cathode of diode 16 is connected both to the cathode of a fourth protective diode 17 and through a current limiting resistor 18 to the negative voltage side of the central office battery 19.

Use of current limiting resistors 15 and 18 instead of the usual blocking inductor is made possible by shunt type NIC 20 which, in accordance with the invention, is not only short circuit stable but effectively open circuit stable as well. NIC 20 is connected, as shown, between the cathode of diode 14 and the anode of diode 17. As will be shown, NIC 20 is powered from central office battery 19 and the resulting current flow forward biases diodes 14 and 17. When telephone set 10 is off-hook, switchhook contacts 11 and 12 provide continuity and current from central office battery 19 also forward biases diodes 13 and 16.

Half of the central office trunk circuit shown in FIG. 1 has been described. This half is coupled to the substantially additional remainder by respective coupling capacitors 21 and 22, connected in series in opposite sides in the line. As illustrated, a second shunt type NIC 23 is connected between capacitors 21 and 22. In addition, capacitor 21 is connected to the anode of a protective diode 24 and capacitor 22 is connected to the cathode of a protective diode 25. The cathode of diode 24 is connected to the cathode of a protective diode 26 and through a current limiting resistor 27 to the negative voltage side of central office battery 19. The anode of diode 25 is connected to the anode of a protective diode 28 and through a current limiting resistor 29 to ground. Finally, the anode of diode 26 and the cathode of diode 28 are connected through respective switchhook contacts 30 and 31 to an associated subscriber telephone set 32. As shown, contact 31 is on the tip side of the line and contact 30 is on the ring side.

Figure 2:
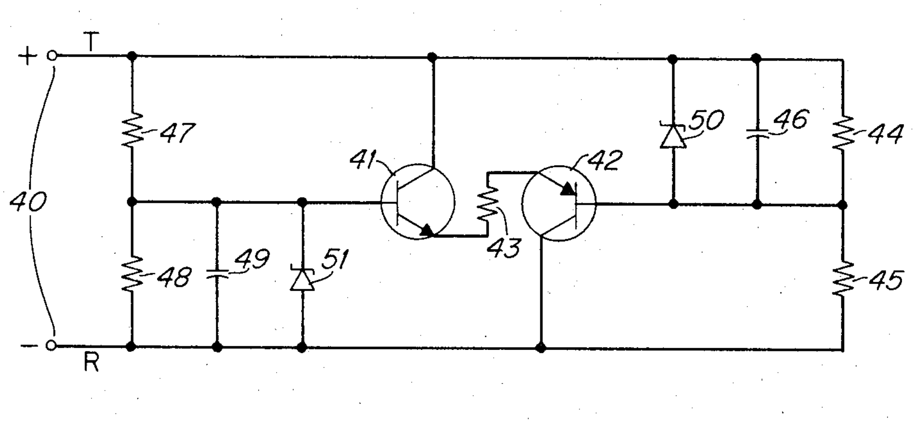
FIG. 2 is a schematic diagram of a specific shunt type negative impedance converter embodying the invention.

Both NIC 20 and NIC 23 in the central office trunk circuit shown in FIG. 1 take the form shown in FIG. 2. The converter there is a two-terminal negative impedance converter of the shunt or reversed current type. It has a single pair of external terminals 40 and a pair of transistors 41 and 42 of opposite conductivity type having their emitter-collector paths connected in series between them. Either or both of transistors 41 and 42 may, of course, take the form of a Darlington pair instead of an individual transistor. As shown, transistor 41 is of the NPN type and transistor 42 is of the PNP type. An NIC terminating resistor 43 is connected between the emitter electrodes of transistors 41 and 42 and their collector electrodes are connected to terminals 40 through the tip and ring leads, respectively.

The base electrodes of transistors 41 and 42 are provided with biasing voltages and AC signals by a pair of circuits which include voltage dividing resistors 44 and 45 and coupling capacitor 46 for transistor 42 and voltage dividing resistors 47 and 48, coupling capacitor 49, and zener diode 51 for transistor 41. As illustrated, resistor 44 and capacitor 46 are connected in parallel between the base of transistor 42 and the tip lead and resistor 45 is connected between the base of transistor 42 and the ring lead. Similarly, resistor 48, capacitor 49, and zener diode 51 are connected in parallel between the base of transistor 41 and the ring lead and resistor 47 is connected between the base of transistor 42 and the tip lead. Resistors 44 and 45 form a voltage divider which sets the base bias for PNP transistor 42 and resistors 47 and 48 and zener diode 51 serve the same purpose for NPN transistor 41. Capacitor 46 couples the AC signal from the tip lead to the base of transistor 42, while zener diode 51 couples the AC signal from the ring lead to the base of transistor 41. In extreme voltage drop conditions, capacitor 49 serves to couple the AC signal to the base of transistor 41.

The components in FIG. 2 which have thus far been described from an NIC which presents a negative impedance of a shunt or reversed current type at external terminals 40. Such a negative impedance, the magnitude of which is controlled by the resistance of terminating resistor 43, serves effectively to counteract the positive resistance of current limiting resistors 15 and 18 and current limiting resistors 27 and 29 in the central office trunk circuit illustrated in FIG. 1. When either subscriber telephone set is off-hook, its switchhook contacts are closed, terminating the associated NIC in a low impedance. Under such conditions, the NIC is unconditionally stable. When a subscriber telephone set is on-hook, however, its switchhook contacts are open, causing the associated NIC to be open circuited. Without more, a shunt type of NIC would oscillate under such conditions.

In accordance with the invention, a zener diode 50 is connected between the tip lead and the base electrode of PNP transistor 42 in FIG. 2 to make the NIC effectively open circuit stable. As shown, diode 50 is poled for forward current flow away from the base of transistor 42 and is reversed bias by the voltage between external terminals 40. When used in the trunk circuit illustrated in FIG. 1 as NIC 20, for example, the NIC shown in FIG. 2 is terminated in a low impedance whenever subscriber telephone set 10 is off-hook. Switchhook contacts 11 and 12 are then closed and the entire central office battery voltage drop appears across resistors 15 and 18. As has already been pointed out, the shunt type NIC illustrated in FIG. 2 is stable in such conditions. When subscriber telephone set 10 in FIG. 1 goes on-hook, however, switchhook contacts 11 and 12 open and the office battery voltage drop appears across resistors 15, 18, 44 and 45 in series. The voltage drop across both resistors 44 and 45 rises sharply but that across resistor 44 is limited by the breakdown voltage of zener diode 50, causing the additional voltage rise to take place across resistor 45 alone. As a result, the voltage at the base of PNP transistor 42 rises more rapidly than the voltage at its emitter, causing the bias on the emitter-base function of transistor 42 to reverse and both resistors 41 and 42 to switch to their nonconducting states. Oscillation under open circuit conditions thus cannot occur.

Finally, a second zener diode 51 is connected in parallel with resistor 48 in the NIC shown in FIG. 2 in order to limit the current drawn by transistors 41 and 42 before they are switched to their nonconducting states. As illustrated, it is poled for forward current flow toward the base electrode of transistor 41. When subscriber telephone set 10 in FIG. 1 goes on-hook and switchhook contacts 11 and 12 close, the voltage across resistors 47 and 48 rises sharply, just as it does across resistors 44 and 45. Zener diode 51 limits the rise across resistor 48, however, causing the voltage at the base electrode of transistor 41 to rise less than that at its emitter electrode. As a result, the forward bias on the emitter-base junction of transistor 41 is reduced, increasing the impedance of the emitter-collector path of transistor 41, and decreasing the current drawn through the emitter-collector paths of transistors 41 and 42.

As has been pointed out, the shunt type NIC illustrated in FIG. 2 is not only short circuit stable but effectively open circuit stable as well. In addition, it has the advantage of requiring no external operating bias supply. It is operated entirely from the voltage drop which appears across the battery feed resistors which it is intended to cancel. In the telephone trunk circuit shown in FIG. 1, the result is a low supervisory impedance and, because the AC impedance of the NIC is high, there is no significant attenuation of speech currents.

I claim:

1. A shunt type negative impedance converter having a pair of external terminals and exhibiting not only short but also open circuit stability which comprises a pair of transistors of opposite conductivity type having their collector electrodes connected to respective ones of said external terminals, a terminating impedance connected between the emitter electrodes of said transistors, a biasing voltage source and at least one impedance connected in series between said external terminals to pass current through the emitter-collector paths of both of said transistors, and a pair of voltage dividers connected between said external terminals and in circuit with the base electrodes of respective ones of said transistors to provide operating biases to said base electrodes, at least one of said voltage dividers including a voltage limiter between the base electrode of its transistor and the collector electrode of the other transistor to switch both of said transistors to their nonconducting states in response to an open circuit between said external terminals.

2. A shunt type negative impedance converter in accordance with claim 1 in which said pair of transistors includes a NPN transistor and a PNP transistor and said voltage limiter is connected between the base electrode of said PNP transistor and the collector electrode of said NPN transistor.

3. A shunt type negative impedance converter in accordance with claim 2 in which said voltage limiter is a zener diode poled for reverse current flow in the direction from the collector electrode of said NPN transistor toward the base electrode of said PNP transistor.